July 26, 1932.  F. S. LOW  1,868,946
MANUFACTURE OF HYDROCHLORIC ACID
Filed Sept. 14, 1928
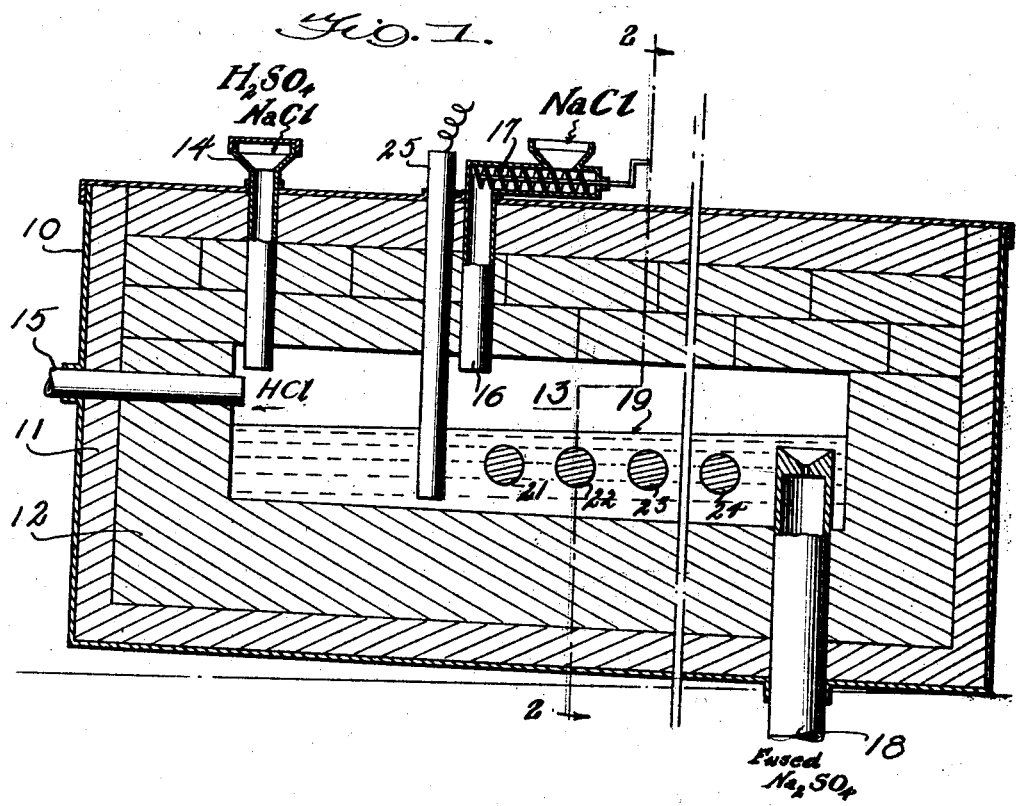
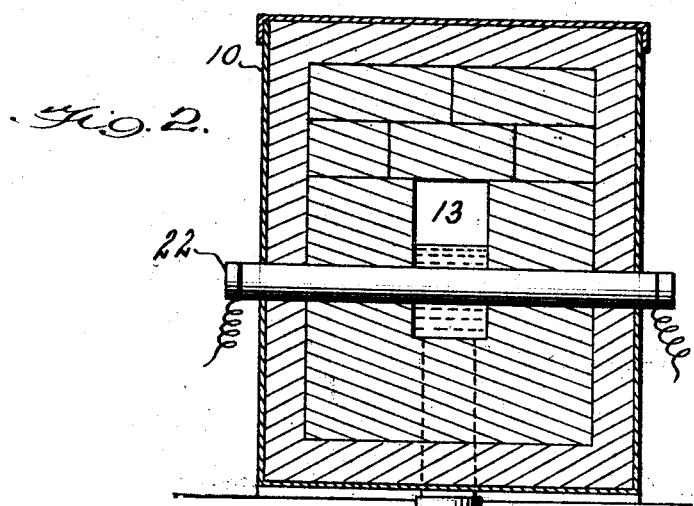
Inventor
Frank S. Low,
By W. P. McElroy
Attorney Patented July 26, 1932

1,868,946

UNITED STATES PATENT OFFICE

FRANK S. LOW, OF NIAGARA FALLS, NEW YORK, ASSIGNOR TO WESTVACO CHLORINE PRODUCTS, INC., OF NEW YORK, N. Y., A CORPORATION OF WEST VIRGINIA

MANUFACTURE OF HYDROCHLORIC ACID

Application filed September 14, 1928. Serial No. 306,071.

This invention relates to the manufacture of hydrochloric acid; and it comprises a method of making HCl gas, and solutions thereof from salt and sulfuric acid or acid sodium sulfate in continuous operation with full recovery of the values of both, wherein there is established and maintained a localized zone of high temperature at one end of a closed elongated reaction chamber, the temperature being there sufficient to fuse a neutral sulfate of an alkali metal, supplying equivalent amounts of alkali metal chlorid and sulfuric acid to said chamber and withdrawing HCl gas therefrom, said supply being at the colder end, and tapping off molten neutral sulfate at the hotter end; and it also comprises apparatus for the continuous production of HCl and $Na_2SO_4$ comprising an elongated chamber of refractory material, means at one end for supplying salt and sulfuric acid thereto, means for collecting and removing HCl gas, electric heating means at the other end adapted to establish and maintain a temperature of 900° C. or higher and means for collecting and removing fused sodium sulfate at the heated end; all as more fully hereinafter set forth and as claimed.

The oldest method for the production of HCl and the manufacture of salt cake ($Na_2SO_4$) consists in the treatment of sodium chlorid with the correct amount of sulfuric acid. Reaction takes place in two stages and it has been customary in the art to perform these two stages in two different pieces of apparatus. The first action that takes place is the formation of HCl gas and acid sodium sulfate ($NaHSO_4$). This action takes place at a low temperature and quite readily, HCl gas coming off in torrents as soon as the mixture is made. In the older art this first stage of action was usually performed in lead pans. If the original mixture was in the proportion of 2NaCl (117 parts) and $H_2SO_4$ (98 parts) the product at the end of this first operation is a mixture of unchanged salt and sodium bisulfate. On bringing this mixture to a high temperature, the sodium acid sulfate reacts with the salt, giving off HCl and forming neutral sodium sulfate. This second stage of operation, because of the high temperatures necessary, was sometimes performed in a reverberatory and sometimes in what was called a blind roaster, a sort of muffle furnace. In either event, the HCl gas was not given off as full strength gas but was more or less diluted with foreign gases. This prevented the direct use of HCl from the second stage of operation for making commercial full strength "hydrochloric acid" or "muriatic acid". The secondary HCl was generally taken up in water and the weak hydrochloric acid so formed strengthened by gas from the lead pans. The second stage of operation was hard on apparatus because of the corrosive nature of the reagents and was costly for labor. Often, in making HCl the second stage is simply omitted and salt and sulfuric acid used in the proportions of 1 NaCl to $H_2SO_4$, the product (acid sodium sulfate) being sold as a substitute for nitre cake.

I have found that both operations can be performed consecutively and as a continuous process with economy in operation and recovery of full strength HCl gas, by feeding salt and sulfuric acid progressively through a long electrically heated chamber, the heat at one end being sufficient to melt neutral sodium sulfate and deliver it as a flowing liquid. No conveyor means are necessary, the materials flowing through first as a mixture of salt and acid, then as a mixture of salt and fused bisulfate and finally as fused neutral sulfate; the several stages of course merging with each other. If desired, acid sodium sulfate may be used in lieu of sulfuric acid, the two materials here being regarded as equivalents. In practice I generally maintain the feed end of the reaction chamber at a temperature around 300° C. and the delivery end at a temperature somewhere between 900° and 1000° C. In the case of potassium sulfate, that is when working with a mixture of KCl and sulfuric acid, the delivery end must be maintained at a somewhat higher range of temperatures; up to 1100° C. or thereabouts. In the performance of the present process, quite unexpectedly, it is found that the actions are much less corrosive than was the case in the old two-stage operation and that a wide variety of structural materials can be employed. No great amount of corrosion is noted at any point. The difference is ascribed to the absence of fire gases. Such gases, or air, would, if present, also contaminate the evolved HCl, which is not desired. The electric heating means may be of any type desired. Resistances in the wall or in the bath may be used, or an alternating current sent through the flowing bath transversely at the hot end. A comparatively small quantity of heat is required at the feed end, since the HCl gas carries heat thither and sufficient heat may then be supplied by conduction. Gradation of temperature from end to end is more or less automatic and in practice it is mostly sufficient merely to heat the discharge end to about 900°–1000° C.

The HCl gas discharged is pure, containing no foreign gases. It is only diluted with the water from the sulfuric acid and salt used. It may therefore be employed for making commercial hydrochloric acid of any strength desired up to the maximum commercial strengths of 40–43 per cent HCl by absorption in tourils or in any of the other usual ways. All the HCl from the salt is given as full strength gas.

While I have spoken more specifically of sodium chlorid it will be understood that the present invention is equally applicable to the manufacture of HCl and potassium sulfate from potassium chlorid.

The invention may be further understood by reference to a description of an apparatus suitable for utilizing the same, shown in the accompanying drawing, wherein, Figure 1 is a longitudinal cross-sectional view of the apparatus; and Figure 2 is a transverse cross-sectional view taken on line 2—2 of Figure 1.

The apparatus shown in the drawing consists of an enclosed chamber into which may be fed the raw materials at one end, which flow, as the reaction progresses, to the other end, from which molten sodium sulfate is withdrawn; the liberated HCl being removed through a pipe disposed adjacent the intake end, and the entire bath being heated by means of suitably disposed resistances or electrodes connected to a source of alternating current. The entire chamber is contained in a metal shell 10 within which is disposed heat insulating brick 11 and refractory brick 12 enclosing a reaction chamber 13. For an apparatus suitable to deliver one ton of HCl per day the chamber 13 may be about four feet long, one foot deep, and six inches wide. The time of passage through such a chamber should be about two hours. At one end of the chamber is a feed pipe 14 of heat resistant material which passes downwardly through the top of the apparatus opening into the extreme left hand portion of the chamber 13. The raw materials, salt, sulfuric acid, etc., may be introduced through the pipe 14. Adjacent the lower extremity of the pipe 14 is another pipe 15 through which HCl may escape. It will of course be understood that these pipes are suitably trapped and connected to other enclosed members, so that raw materials will not pass into the acid exit pipe, nor HCl into the hopper from which the raw materials are supplied.

An auxiliary feed for salt is shown adjacent the mid-zone of the reaction chamber as a pipe 16 connected to a screw conveyor 17. This device may be used to add salt to partially converted sulfuric acid. At the other end of the chamber 13 is a draw-off pipe 18, which has its upper end positioned below the normal level 19 of the fused bath. This pipe conveys fused sodium sulfate to a suitably disposed receiver, not shown.

The bath is electrically heated. Advantageously, a number of resistors 21, 22, 23, 24, etc., are disposed transversely of the apparatus. These resistors may be formed by winding high resistance wire, such as nichrome, on a quartz tube or wire may be wound on a fire clay mandrel and covered with a quartz tube. The resistors should be so wound as to supply a maximum amount of heat to the discharge end of the chamber, and they should also be so connected to a source of electricity as to permit of the application of a greater or less amount of heat locally, as conditions during operation may warrant. In another way of operating, the discharge pipe 18 may also serve as an electrode and be paired with another electrode 25 passing through the walls of the apparatus into the bath. In such case, alternating current should be used to prevent electrolysis of the bath.

In operation, the raw materials are fed through the pipe 14 and flow gradually from one end of the furnace to the other. The salt and acid react, the fused sodium sulfate being eventually withdrawn from the right hand end of the chamber, and the HCl through the pipe 15. A slight suction may be applied in the HCl line, in order to prevent leakage of the gas. The apparatus should, of course, be as air tight as possible.

What I claim is:—

1. In the manufacture of HCl and neutral alkali metal sulfate from alkali metal chlorid and sulfuric acid, a process which comprises feeding the chlorid and the acid in about the proportions required to form the neutral sulfate into a stationary horizontally elongated chamber, heating the reacting materials in the chamber to temperatures increasing progressively along the length of the chamber with the maximum temperature within the chamber at or above the melting point of the neutral sulfate, the reacting materials being caused to move by liquid flow along the length of the chamber under the influence of said progressively increasing temperature, removing neutral sulfate from the chamber in molten form and removing HCl gas from the chamber.

2. In the manufacture of HCl and neutral sodium sulfate from sodium chlorid and sulfuric acid, a process which comprises feeding the chlorid and the acid in about the proportions required to form the neutral sulfate into a stationary horizontally elongated chamber, heating the reacting materials in the chamber to temperatures increasing progressively along the length of the chamber with the maximum temperature within the chamber at or above the melting point of the neutral sodium sulfate, the reacting materials being caused to move by liquid flow along the length of the chamber under the influence of said progressively increasing temperature, removing neutral sodium sulfate from the chamber in molten form and removing HCl gas from the chamber.

3. A continuous process of producing $Na_2SO_4$ and full strength HCl from salt and sulfuric acid which comprises feeding the salt and the sulfuric acid in proportions making $Na_2SO_4$ into a stationary horizontally elongated chamber heated by electric currents to temperatures increasing progressively along the length of the chamber, the final temperature being in excess of 900° C. and the reacting materials being caused in said progressive heating to move in a liquid flow along the length of the chamber, removing HCl from the chamber at the low temperature end and removing $Na_2SO_4$ in molten form at the high temperature end.

4. In the process of claim 1, replacing the sulfuric acid by bisulfate.

In testimony whereof I have hereunto affixed my signature.

FRANK S. LOW.